(12) United States Patent
Oki et al.

(10) Patent No.: US 7,540,212 B2
(45) Date of Patent: Jun. 2, 2009

(54) CLUTCH HOUSING

(75) Inventors: Hideki Oki, Fukuroi (JP); Shouji Yatsuyanagi, Fukuroi (JP); Tomoyuki Miyazaki, Fukuroi (JP); Kiyokazu Ichikawa, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 255 days.

(21) Appl. No.: 11/212,747

(22) Filed: Aug. 29, 2005

(65) Prior Publication Data

US 2006/0042903 A1 Mar. 2, 2006

(30) Foreign Application Priority Data

Aug. 30, 2004 (JP) ............................. 2004-249491

(51) Int. Cl.
*F16D 13/58* (2006.01)

(52) U.S. Cl. .................... 74/434; 192/70.2; 192/112

(58) Field of Classification Search ................ 192/112
See application file for complete search history.

(56) References Cited

U.S. PATENT DOCUMENTS

| 5,384,949 | A | * | 1/1995 | Wodrich et al. | ............... 29/557 |
| 6,523,663 | B2 | * | 2/2003 | Murata | ....................... 192/70.2 |
| 6,530,253 | B1 | * | 3/2003 | Gotou et al. | .................... 72/85 |
| 6,769,522 | B2 | * | 8/2004 | Kawamoto et al. | ......... 192/3.29 |
| 2004/0056428 | A1 | * | 3/2004 | Yoshida | ....................... 277/572 |

FOREIGN PATENT DOCUMENTS

JP 8309469 A 11/1996
JP 2005155857 A * 6/2005

* cited by examiner

*Primary Examiner*—Richard M. Lorence
(74) *Attorney, Agent, or Firm*—Miles & Stockbridge P.C.

(57) ABSTRACT

A method of manufacturing a clutch housing which accommodates therein a plurality of clutch plates adapted to be engaged together so as to transmit a torque, wherein a drum portion and a boss portion can be integrally formed from a plate material so as to form a thick portion having a thickness of not less than approximately 1.3 times as large as that of the plate material and a thin portion having a thickness of not greater than approximately ½ of that of the plate material.

3 Claims, 2 Drawing Sheets

CLUTCH HOUSING

BACKGROUND OF THE INVENTION

1. Field of the Invention

The present invention relates to a clutch housing for an automatic transmission used in an automobile or the like, and to a method of manufacturing thereof.

2. Description of the Related Art

Conventionally, a clutch housing has been formed in such a way that a boss portion which requires a stiffness is formed from a billet by forging or cutting while a drum portion is formed into a drum-like shape from a flat plate by pressing or the like, and both portions are thereafter coupled together by plastic deformation or welding.

In order to ensure an appropriate wall thickness for a product so as to satisfy demand characteristics, the clutch housing has been manufactured as a product consisting of not less than two kinds of portions coupled together. In general, portions, that is, the so-called inner hub and outer housing, have been formed under different process controls, have then been coupled by plastic deformation or welding, and have finally been finished.

However, since two portions have been coupled by plastic deformation or welding, there have raised a problem of lowering the strength of a coupling part therebetween or lowering of the reliability thereof, and further, a problem of requiring a contour finishing process of a forged portion formed from a billet with the use of cutting. Further, in a conventional forming process, since an appropriate wall thickness cannot be ensured for demand characteristics in the case of integral formation, separate product designs and separate process plannings have been inevitably required, and accordingly, there has been raised such a problem that hindrance to manufacturing costs due to the necessity of an extra cutting process caused by a material layout in view of a maximum wall thickness, and of a coupling process in view of separate product designs and the like, and a risk of lowering the reliability have not been able to be completely eliminated.

In order to ensure a required strength, Japanese Patent Laid-Open No. H08-309469 discloses a process for restraining roll-over of a corner part of a product. However, in this process, a wall thickness can not be ensured for several parts, except only a part such as a corner part, and accordingly, there has been raised a problem in view of ensuring an overall strength of a hub portion.

Thus, an object of the present invention is to provide a method of manufacturing a clutch housing, in which a boss portion and a drum portion can be integrally formed by pressing, a sufficient wall thickness can be obtained for any of required parts so as to enhance the strength while external dimensions can be substantially finished by press-forming so as to eliminate the necessity of extra process steps and the necessity of an extra contour finishing process step which are caused in the case of coupling two portions, thereby it is possible to reduce the manufacturing costs.

SUMMARY OF THE INVENTION

To the end, according to the present invention, there is provided a method of manufacturing a clutch housing for accommodating therein a plurality of clutch plates which are adapted to be engaged together in order to transmit a torque, characterized in that a drum portion and a boss portion are integrally formed from a plate material so as to form a thick portion having a thickness of not less than approximately 1.3 times as large as a thickness of the plate material and a thin portion having a thickness of not greater than approximately ½ of the thickness of the plate material.

Further, according to the present invention, there is provided a clutch housing for accommodating a plurality of clutch plates which are adapted to be engaged so as to transmit a torque, characterized by a drum portion and a boss portion which are integrally formed from a plate material, including a thick wall thickness portion having a thickness of not less than about approximately 1.3 times as large as a thickness of the plate material, and a thin wall thickness part having a thickness of about approximately ½ of the thickness of the plate material.

The present invention can exhibit the following technical effects and advantages:

Since the clutch housing is of an integrally formed boss portion type with no joints can be formed and since a part which requires a high strength has a thick wall thickness while other parts which do not require a high strength have a required minimum wall thickness as to a required strength, it is possible to aim at reducing the weight of the clutch housing.

Due to no joints by welding are present and due to a wall thickness process by pressing, the overall strength of the clutch housing can be enhanced. Further, since required minimum cutting steps are carried out, the number of extra cutting steps can be reduced. Thereby it is possible to aim at reducing the manufacturing costs thereof.

Further, due to the integral formation, there can be eliminated the necessity of producing not less than two kinds of portions and the necessity of coupling these portions, thereby it is possible to reduce the number of cutting steps and to enhance the reliability.

DESCRIPTION OF THE PREFERRED EMBODIMENTS

Figure 1:
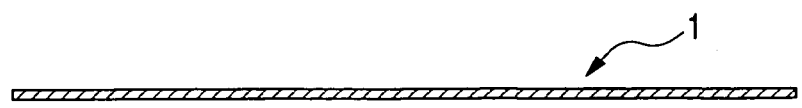
FIG. 1 is an axially sectional view illustrating a workpiece used in an embodiment of the present invention.

Detailed explanation will be hereinbelow made of an embodiment of the present invention with reference to the accompanying drawings. It is noted that the following explanation will be made of an exemplified form of the present invention, and accordingly, it goes without saying that the present invention should not be limited to this embodiment by any means. Various change and modification can be made to this embodiment without departing the technical scope of the present invention. Further, like reference numerals are used to denote like parts throughout the drawings.

FIGS. 1 to 7 are axially sectional views illustrating an embodiment of a manufacturing method in which the present invention is applied to a clutch drum, that is, a clutch housing. These figures show process steps for forming a complete product from a material blank or a workpiece by plastic working or pressing. At first, referring to FIG. 1, a workpiece (material blank) 1 which is a substantially circular planner steel sheet, is prepared, having a predetermined size from which a clutch housing to be manufactured can have a required shape and volume.

Figure 2:
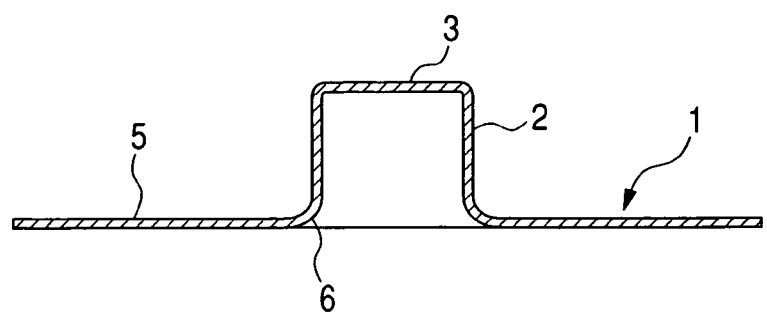
FIG. 2 is a view for explaining a step of forming a hub portion.

Next, the workpiece 1 is formed into a shape shown in FIG. 2 by plastic working by pressing. The workpiece shown in FIG. 2 is formed so as to have a substantially planar disc part, a substantially cylindrical boss portion, that is, a hub portion 2, and a top part 3 covering the hub portion 2. Between the disc part 5 and the hub portion 2, an annular curved surface part 6 having a predetermined curvature is formed.

Figure 3:
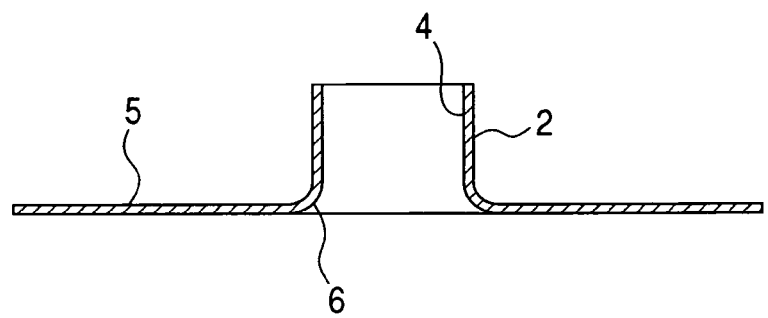
FIG. 3 is a view illustrating a condition in which a top part of the workpiece shown in FIG. 2 is punched out.

Next, referring to FIG. 3, the top part 3 is punched out by pressing so as to define a through bore 4 in the hub portion 2. Thereafter, the workpiece is subjected to machining as shown in FIG. 4.

Figure 4:
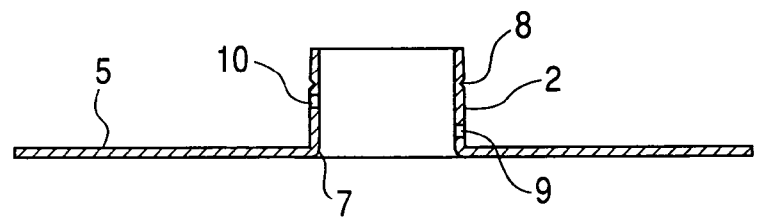
FIG. 4 is a view for explaining a step of machining the hub portion.

Referring to FIG. 4, an annular circumferential groove 8 is formed in an outer peripheral surface of the hub portion 2. This circumferential groove 8 is adapted to be fitted therein with a stopper ring, an O-ring or the like. Further, the cylindrical part of the hub portion 2 is formed therein with oil holes 9, 10 piercing therethrough, by drilling or the like. The oil holes 9 and 10 are formed in a circumferential direction by a plural number which is optional. It is noted here that these holes are preferably formed at circumferentially equal pitches. At this time, since nothing is present around the hub portion 2, drilling can be easily made for forming the oil holes, thereby it is possible to drill the holes at precise positions.

Figure 5:
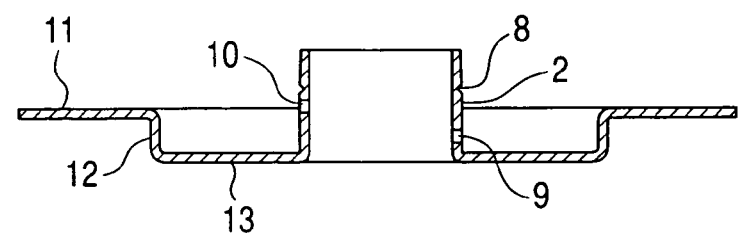
FIG. 5 is a view for explaining a step of drawing the workpiece.
Figure 6:
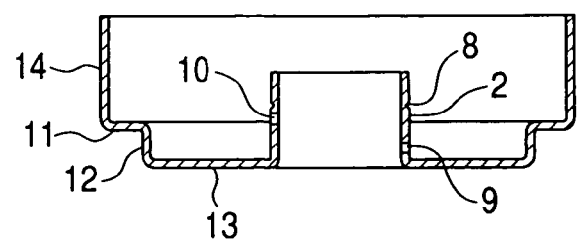
FIG. 6 is a view for forming an outer drum portion by drawing the workpiece so as to form a drum portion.

FIGS. 5 and 6 show process steps for subjecting the workpiece 1 to drawing in order to form an outer drum portion. At first, by drawing the disc part 5, an inner diameter disc part 13 and an outer diameter disc part 11 are formed. The inner diameter disc part 13 and the outer diameter disc part 11 are joined together through the intermediary of a first cylindrical part 12.

Next, referring to FIG. 6, by further drawing the workpiece 1, the outer diameter part 11 is deformed so as to form a substantially cylindrical outer hub portion 14. As clearly understood from FIGS. 5 and 6, the cylindrical portion 12 has a height which is a substantially half of the height of the hub portion 2, and the outer drum portion 14 is axially extended so as to completely surround the hub portion 2.

Figure 7:
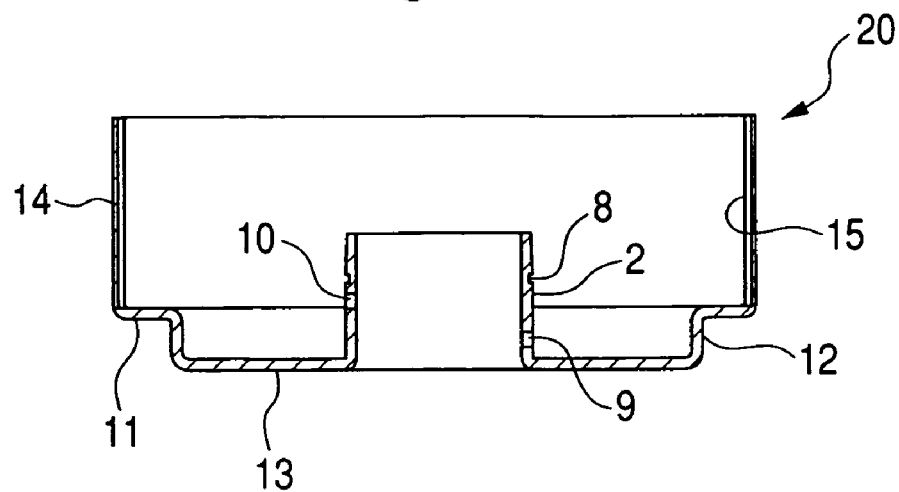
FIG. 7 is an axially sectional view illustrating a clutch housing having a substantially completed form by splining the outer drum.

Finally, referring to FIG. 7, splines 15 are formed in the inner peripheral surface of the outer drum portion 14. That is, teeth are formed in the inner peripheral surface, and accordingly, a substantially completed clutch housing 20 is obtained. As understood from FIG. 7, although the teeth, that is, the splines 15 are formed in both inner peripheral and outer peripheral surfaces of the outer drum portion 14, they may be formed only the inner or outer peripheral surface of the outer drum portion 14.

After the step shown in FIG. 7, a process step of finishing the product is carried out by lathing. It is noted that a space surrounded by the outer drum portion 14 is accommodated therein with a frictionally engaging device (which is not shown) as a clutch, which is pressed by a piston (which is not shown) that can be displaced by hydraulic pressure in a hydraulic chamber (which is not shown) defined between the outer drum portion 14 and the disc part 13.

Finishing by cutting may be made for only required parts although it may be made for the overall clutch housing. For example, referring to FIG. 7, the respective inner surfaces of the cylindrical part 12 and the outer cylindrical part 14, the inner surface and the outer surface of the hub portion 2 are finished. That is, cutting is made only for a part which makes contact with a seal member which is not shown, and a snap groove.

Figure 8:
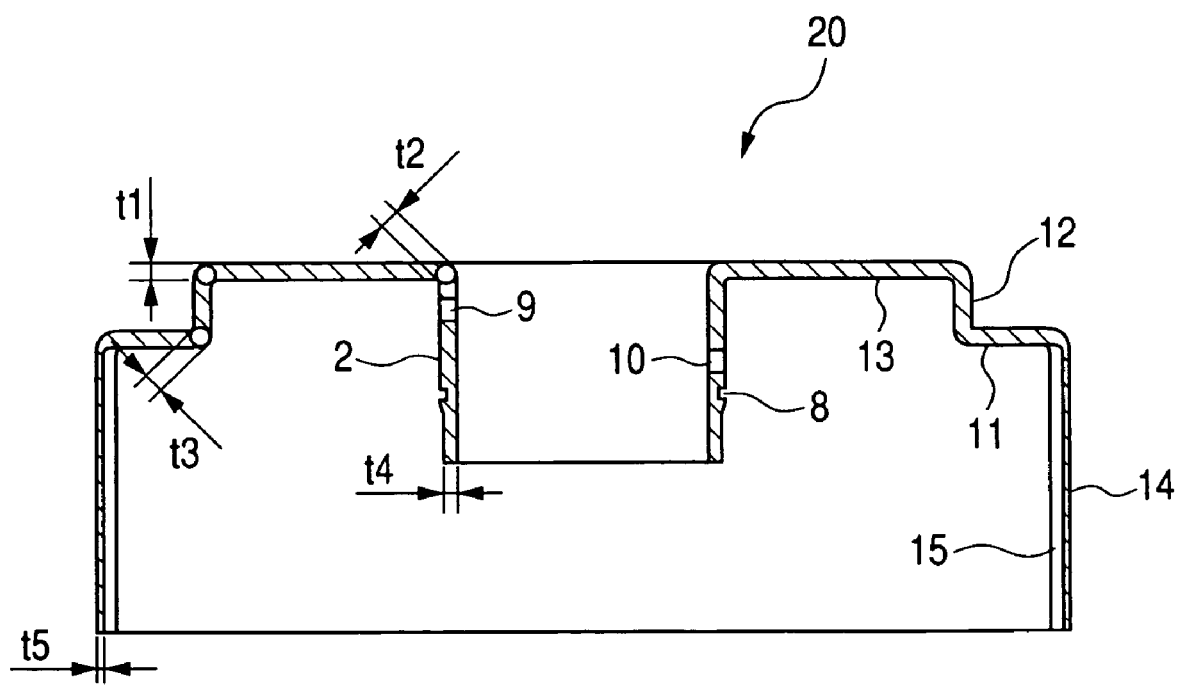
FIG. 8 is an axially sectional view illustrating a clutch housing according to the present invention, before a finishing step in order to show a thickness relationship among several parts of the clutch housing.

FIG. 8 is an axially sectional view illustrating a clutch housing according to the present invention in a condition before finishing by cutting in order to show a thickness relationship among several parts of the clutch housing.

In FIG. 8, $t_1$ denotes a thickness of the workpiece 1 which is a blank plate material, $t_2$ a maximum thickness of a seal ring insertion portion, $t_3$ a maximum thickness of a slide portion of the piston, $t_4$ a thickness of the hub portion 2 and $t_5$ a thickness of the spline portion.

In order to satisfy predetermined requirements, The wall thicknesses as stated above are set, for example, as follows:

$$t_2 \geq 1.3 t_1$$

$$t_5 < 0.5 t_1$$

Although no specific limitation is made to the Hardness of the workpiece 1 as a plate material, it can expected that a workpiece 1 having a hardness of not less than Hv110 exhibits remarkable technical effects in addition to the above-mentioned relationship. Further, in view of the thickness relationship shown in FIG. 8, the process step of increasing the wall thickness of the clutch housing 20 is carried out at the same time as the process steps shown in FIGS. 2 and 3 are carried out.

Although the explanation has been made of such a configuration that the hub portion 2 is extended in the clutch housing 20, it goes without saying that the present invention can be applied to another configuration, that is, the hub portion 2 is extended outside of the housing or both outside and inside thereof. That is, the present invention can be used broadly for manufacturing a member having teeth.

The clutch housing formed by the manufacturing method according to the present invention can be used in an automatic transmission, and a multi-disc type frictionally engaging device incorporated therein may be applied in any usage, as a wet type clutch.

This application claims priority from Japanese Patent Application No. 2004-249491 filed Aug. 30, 2004, which is hereby incorporated by reference herein.

What is claimed is:

1. A clutch housing for a plurality of clutch plates adapted to be engaged together so as to transmit a torque, said clutch housing comprising:
    a hollow boss provided in a central area;
    an outer drum with a spline portion provided to radially and outwardly enclose the boss, the outer drum extending in the same axial direction as the boss; and
    a disc portion joining the boss and the outer drum,
    wherein the boss, the outer drum and the disc portion are parts of a single piece of plate material, a portion of the boss is thicker than the plate material of the disc portion, and the outer drum spline portion is thinner than the plate material of the disc portion.

2. A clutch housing as set forth in claim 1, wherein the portion of the boss is 1.3 times thicker than the plate material of the disc portion, and the outer drum spline portion is thinner than the plate material of the disc portion.

3. A clutch housing as set forth in claim 1, wherein the plate material has a hardness of not less than Hv 110.

* * * * *